United States Patent
Cheng et al.

(10) Patent No.: US 10,190,663 B2
(45) Date of Patent: Jan. 29, 2019

(54) LINEAR GEAR SHIFT MECHANISM

(71) Applicant: MOTIVE POWER INDUSTRY CO., LTD., Dacun Township (TW)

(72) Inventors: Hsin-Lin Cheng, Dacun Township (TW); Ching-Chung Teng, Dacun Township (TW)

(73) Assignee: MOTIVE POWER INDUSTRY CO., LTD. (TW)

(*) Notice: Subject to any disclaimer, the term of this patent is extended or adjusted under 35 U.S.C. 154(b) by 624 days.

(21) Appl. No.: 14/877,971

(22) Filed: Oct. 8, 2015

(65) Prior Publication Data

US 2017/0102052 A1   Apr. 13, 2017

(51) Int. Cl.
*F16H 15/28* (2006.01)
*F16H 57/04* (2010.01)

(52) U.S. Cl.
CPC ......... *F16H 15/28* (2013.01); *F16H 57/0487* (2013.01)

(58) Field of Classification Search
CPC ....... F16H 15/06; F16H 57/0487; F16H 15/28
USPC .............................. 476/38; 475/189
See application file for complete search history.

(56) References Cited

U.S. PATENT DOCUMENTS

| | | | | | |
|---|---|---|---|---|---|
| 2,860,530 | A | * | 11/1958 | Hine | F16H 15/52 475/190 |
| 3,209,606 | A | * | 10/1965 | Yamamoto | F16H 15/28 476/38 |
| 3,407,687 | A | * | 10/1968 | Hayashi | F16H 15/52 475/189 |
| 4,883,367 | A | * | 11/1989 | Maruyama | F16C 17/026 384/107 |
| 9,347,532 | B2 | * | 5/2016 | Versteyhe | F16H 15/40 |
| 9,933,054 | B2 | * | 4/2018 | Cooper | F16H 15/52 |

FOREIGN PATENT DOCUMENTS

JP    59-190557    * 10/1984

* cited by examiner

*Primary Examiner* — William C Joyce
(74) *Attorney, Agent, or Firm* — Schmeiser, Olsen & Watts, LLP

(57) ABSTRACT

A linear gear shift mechanism includes a support rotator; transmission balls movably disposed at the support rotator and each provided with a cylindrical recess along radial direction thereof; driving posts with inward ends movably disposed in the cylindrical recesses along the radial direction of the support rotator; a gear shift unit movably connected to outward ends of the driving posts to drive the driving posts to rotate from the radial direction of the support rotator to but not reach the axial direction of the support rotator; an axial power input rotator having an inward-tilted power input annular surface; and an axial power output rotator having an inward-tilted power output annular surface, wherein the axial power input rotator and axial power output rotator flank and movably clamp the transmission balls between the inward-tilted power input annular surface, inward-tilted power output annular surface and outer circumferential surface of the support rotator.

12 Claims, 12 Drawing Sheets

LINEAR GEAR SHIFT MECHANISM

FIELD OF TECHNOLOGY

The present invention relates to linear gear shift mechanisms and more particularly to a linear gear shift mechanism which is structurally simple and compact, has a wide linear gear-changing range, incurs little transmission loss, and never jerks while shifting gear.

BACKGROUND

To adjust speed and reduce gasoline consumption, every means of transportation nowadays is equipped with a gear shift mechanism. A conventional gear shift mechanism essentially comprises a gear train or essentially comprises a gear train and an oil duct. However, the gear train or the combination of the gear train and the oil duct is structurally intricate and bulky, has a narrow gear-changing range, incurs much transmission loss, and tends to jerk while shifting gear. Therefore, a stepless gear shift mechanism characterized by two grooved wheels operating in conjunction with a V-shaped belt is developed. However, the stepless gear shift mechanism has disadvantages, namely large volume of the grooved wheels and the V-shaped belt, and a narrow gear-changing range. Accordingly, the present invention aims to disclose a linear gear shift mechanism which is structurally simple and compact, has a wide linear gear-changing range, incurs little transmission loss, and never jerks while shifting gear.

SUMMARY

In view of the aforesaid drawbacks of the prior art, the inventor of the present invention recognized room for improvement in the prior art and thus conducted extensive researches to therefore develop a linear gear shift mechanism which is structurally simple and compact, has a wide linear gear-changing range, incurs little transmission loss, and never jerks while shifting gear.

The present invention provides a linear gear shift mechanism, comprising: a support rotator; a plurality of transmission balls spaced apart from each other and movably disposed on an outer circumferential surface of the support rotator, with a cylindrical recess disposed on each said transmission ball along a radial direction thereof; a plurality of driving posts with inward ends movably disposed in the cylindrical recesses along the radial direction of the support rotator; a gear shift unit movably connected to outward ends of the driving posts and adapted to drive the driving posts to rotate from the radial direction of the support rotator to but not reach the axial direction of the support rotator; an axial power input rotator having an inward-tilted power input annular surface; an axial power output rotator having an inward-tilted power output annular surface, wherein the axial power input rotator and the axial power output rotator are disposed on two opposite sides of the transmission balls to movably clamp the transmission balls between the inward-tilted power input annular surface, the inward-tilted power output annular surface and the outer circumferential surface of the support rotator.

Regarding the linear gear shift mechanism, a first oil-guiding groove is disposed on a circumferential surface of each said driving post.

Regarding the linear gear shift mechanism, the gear shift unit has a driving ring pivotally connected to the outward ends of the driving posts and capable of undergoing translation in an axial direction of the support rotator.

Regarding the linear gear shift mechanism, the gear shift unit has two halved driving rings which mesh with each other, with a plurality of cavities disposed on each said halved driving ring to join and thereby form a plurality of pivotal through holes for pivotally connecting with the outward ends of the driving posts, wherein the halved driving rings undergo translation in an axial direction of the support rotator.

Regarding the linear gear shift mechanism, the axial power input rotator has a first connection shaft pivotally connected to one side of the support rotator, and the axial power output rotator has a second connection shaft pivotally connected to the other side of the support rotator.

Regarding the linear gear shift mechanism, two bearings are disposed on two sides of the support rotator, respectively, and connected to the first connection shaft and the second connection shaft, respectively.

The present invention further provides another linear gear shift mechanism, comprising: a support rotator; a plurality of transmission balls spaced apart from each other and movably disposed on a lateral annular surface of the support rotator, wherein a cylindrical channel or a cylindrical recess is disposed on each said transmission ball along a radial direction thereof; a plurality of driving posts with inward ends movably penetrating the cylindrical channels along the radial direction of the support rotator, respectively, or movably disposed in the cylindrical recesses along the radial direction of the support rotator, respectively; a gear shift unit movably connected to inward ends and outward ends of the driving posts when the inward ends of the driving posts movably penetrate the cylindrical channels, respectively, and movably connected to the outward ends of the driving posts when the inward ends of the driving posts are movably disposed in the cylindrical recesses, respectively, wherein the gear shift unit drives the driving posts to rotate from the radial direction of the support rotator to but not reach the axial direction of the support rotator; an axial power input rotator having an inward-tilted power input annular surface; and an axial power output rotator having an inward-tilted power output annular surface, wherein the axial power input rotator and the axial power output rotator are disposed on a same side of the transmission balls, whereas the support rotator is positioned beside the transmission balls in a manner to be opposite to the axial power input rotator and the axial power output rotator, so as to movably clamp the transmission balls between the inward-tilted power input annular surface, the inward-tilted power output annular surface and the lateral annular surface of the support rotator.

Regarding the aforesaid linear gear shift mechanism, when the inward ends of the driving posts movably penetrate the cylindrical channels, respectively, the gear shift unit has a driving ring and a limitator. A plurality of oblique guide slots is disposed on an inward annular surface of the driving ring. The limitator has a plurality of axial limiting through holes arranged in a manner to surround an axis of the support rotator. An axial guide opening is disposed on a radial outward side of each axial limiting through hole. An axial curved guide slot is disposed on a radial inward side of each axial limiting through hole. The driving ring is movably disposed outside the limitator. The transmission balls are movably confined to the axial limiting through holes, respectively. Two opposite sides of the transmission balls are exposed from two opposite sides of the axial limiting through holes so as to movably come into contact with the inward-tilted power input annular surface, the inward-tilted power output annular surface and the lateral annular surface of the support rotator. The inward ends of the driving posts are movably disposed in the axial curved guide slots, respectively. The outward ends of the driving posts are movably disposed in the oblique guide slots through the axial guide openings, respectively, with the driving ring rotating about the limitator by an axis of the support rotator.

Regarding the aforesaid linear gear shift mechanism, when the inward ends of the driving posts are movably disposed in the cylindrical recesses, respectively, the gear shift unit has a driving ring pivotally connected to the outward ends of the driving posts, thereby allowing the driving ring to undergo translation in an axial direction of the support rotator.

Regarding the aforesaid linear gear shift mechanism, when the inward ends of the driving posts are movably disposed in the cylindrical recesses, respectively, the gear shift unit has two halved driving rings which mesh with each other, with a plurality of cavities disposed on each said halved driving ring and adapted to join and thereby form a plurality of pivotal through holes for pivotally connecting with the outward ends of the driving posts. The halved driving rings undergo translation in an axial direction of the support rotator.

Regarding the aforesaid linear gear shift mechanism, the axial power input rotator has an axial power input shaft which passes the transmission balls and penetrates the support rotator to get exposed from the support rotator.

The aforesaid linear gear shift mechanism further comprises a ball ring which has a plurality of balls and a positioning ring. The balls are spaced apart from each other, movably positioned at the positioning ring, and movably clamped between the axial power input rotator and the axial power output rotator.

Therefore, the linear gear shift mechanism of the present invention is structurally simple and compact, has a wide linear gear-changing range, incurs little transmission loss, and never jerks while shifting gear.

BRIEF DESCRIPTION

Objectives, features, and advantages of the present invention are hereunder illustrated with specific embodiments in conjunction with the accompanying drawings, in which.

Figure 5:
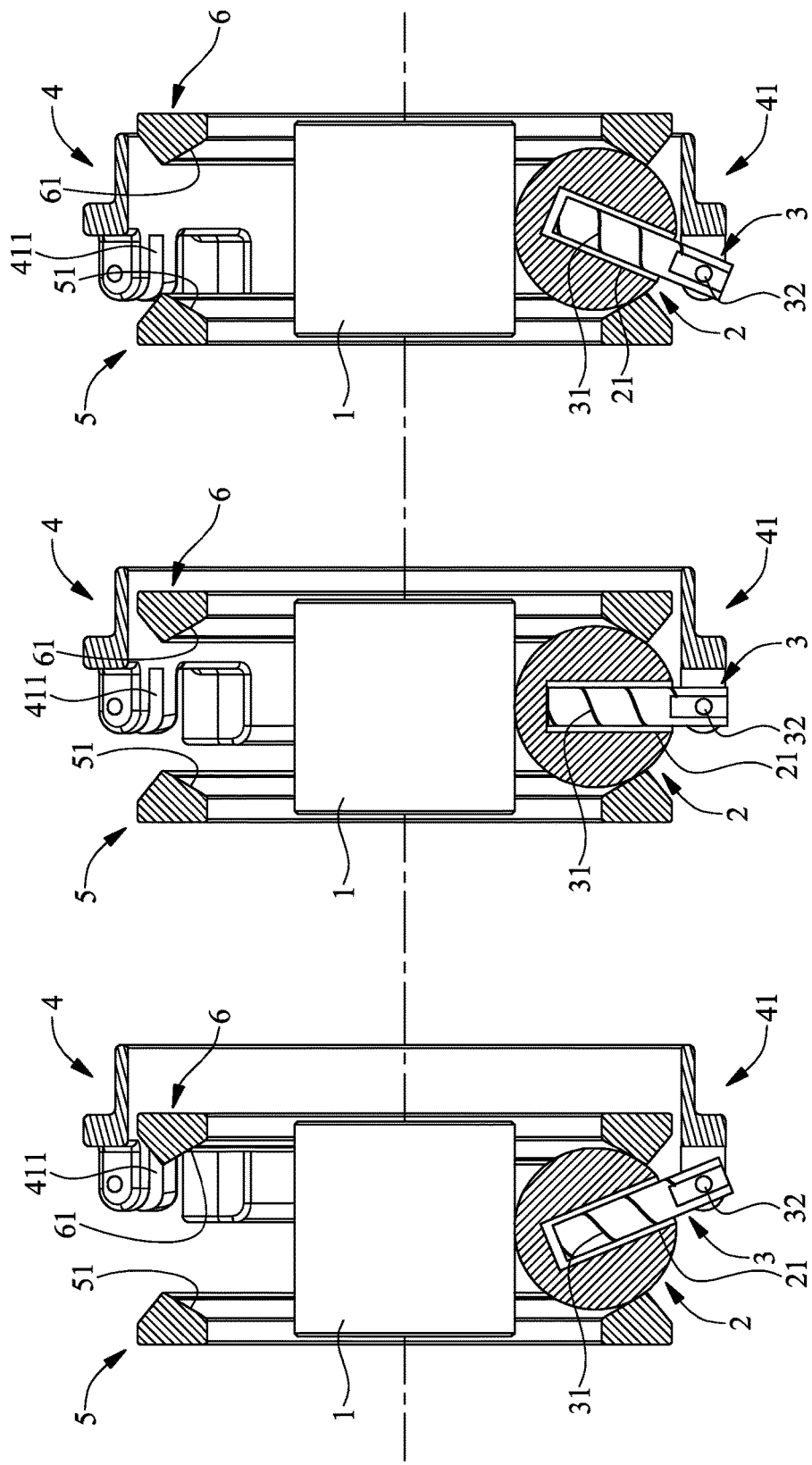
Figure 6:
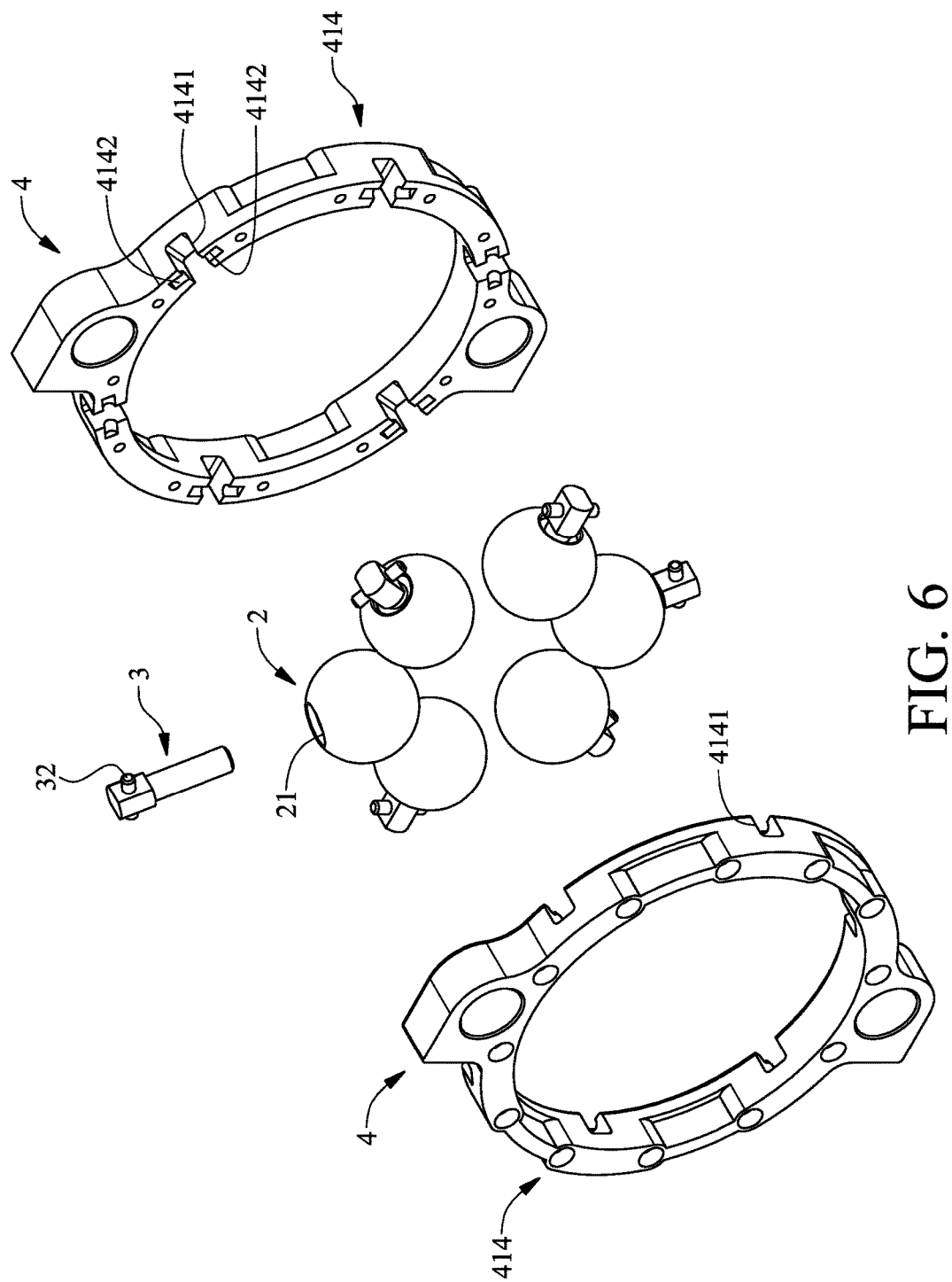
Figure 7:
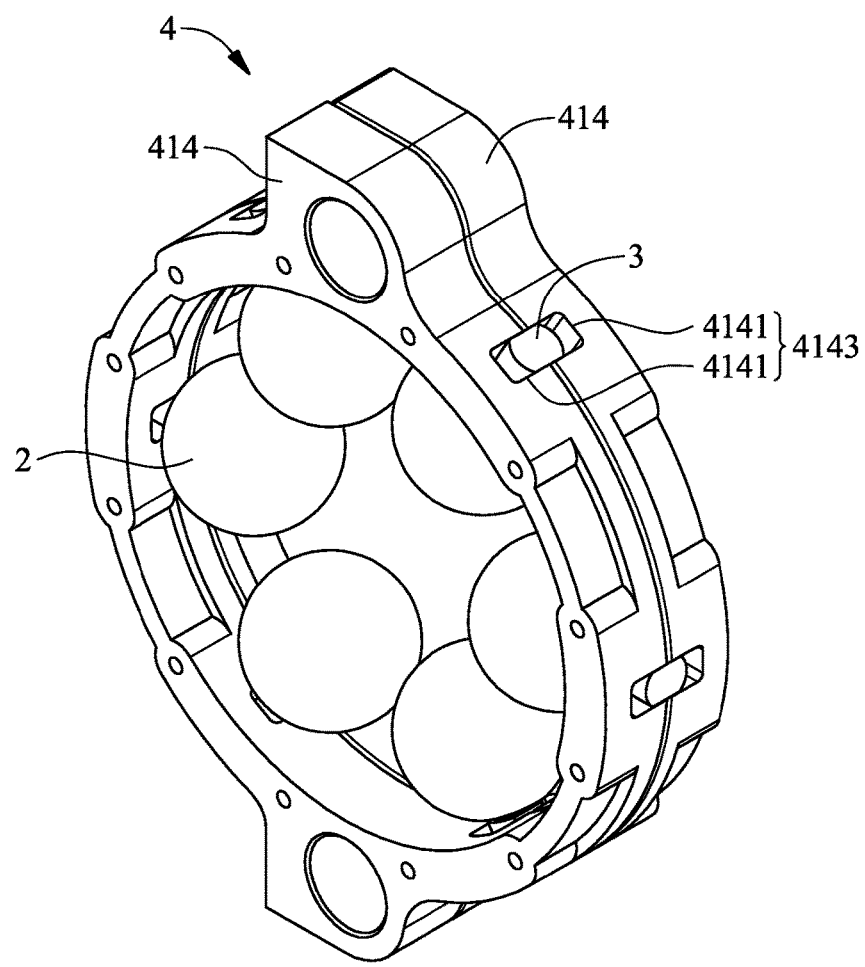
Figure 8:
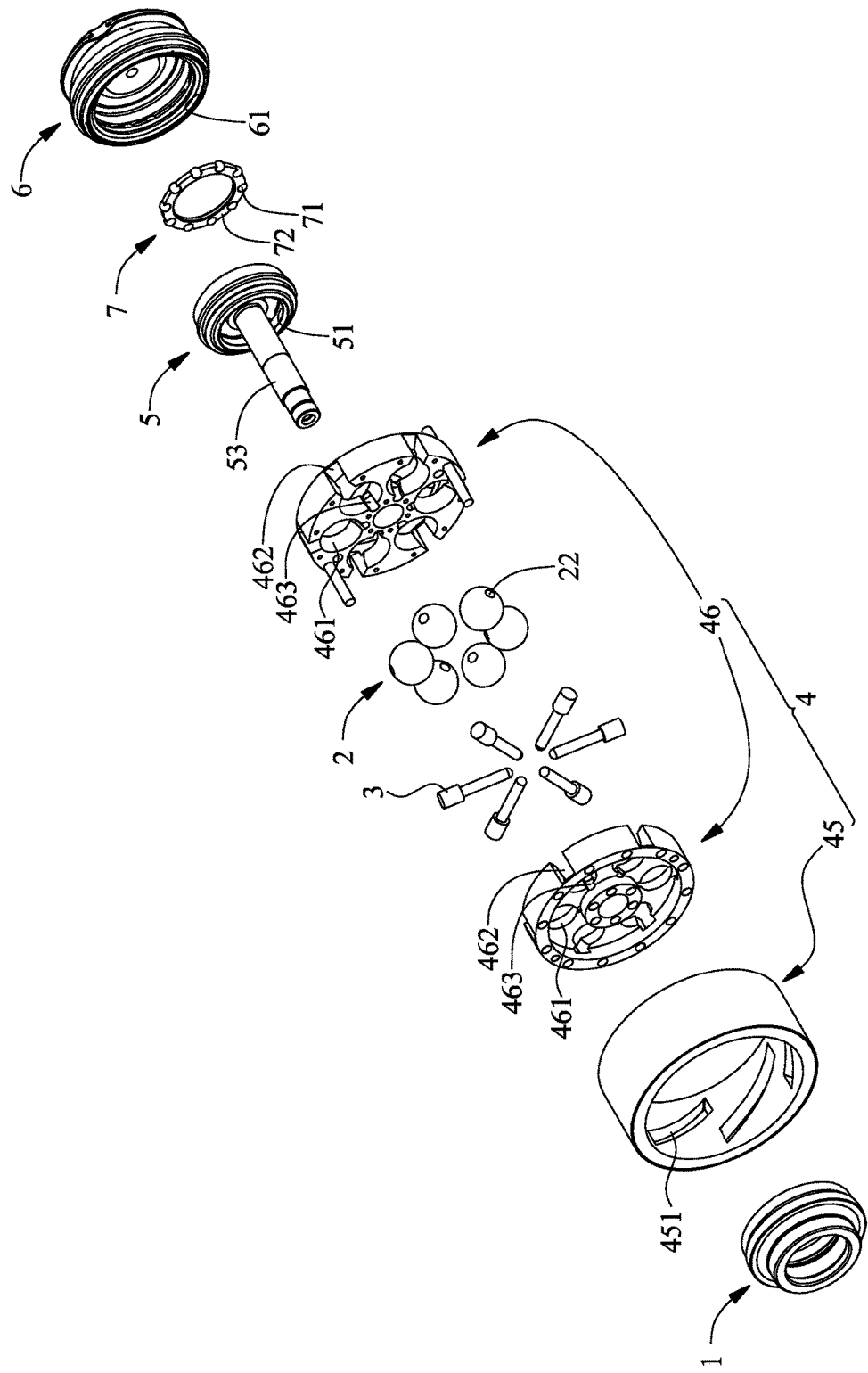
Figure 9:
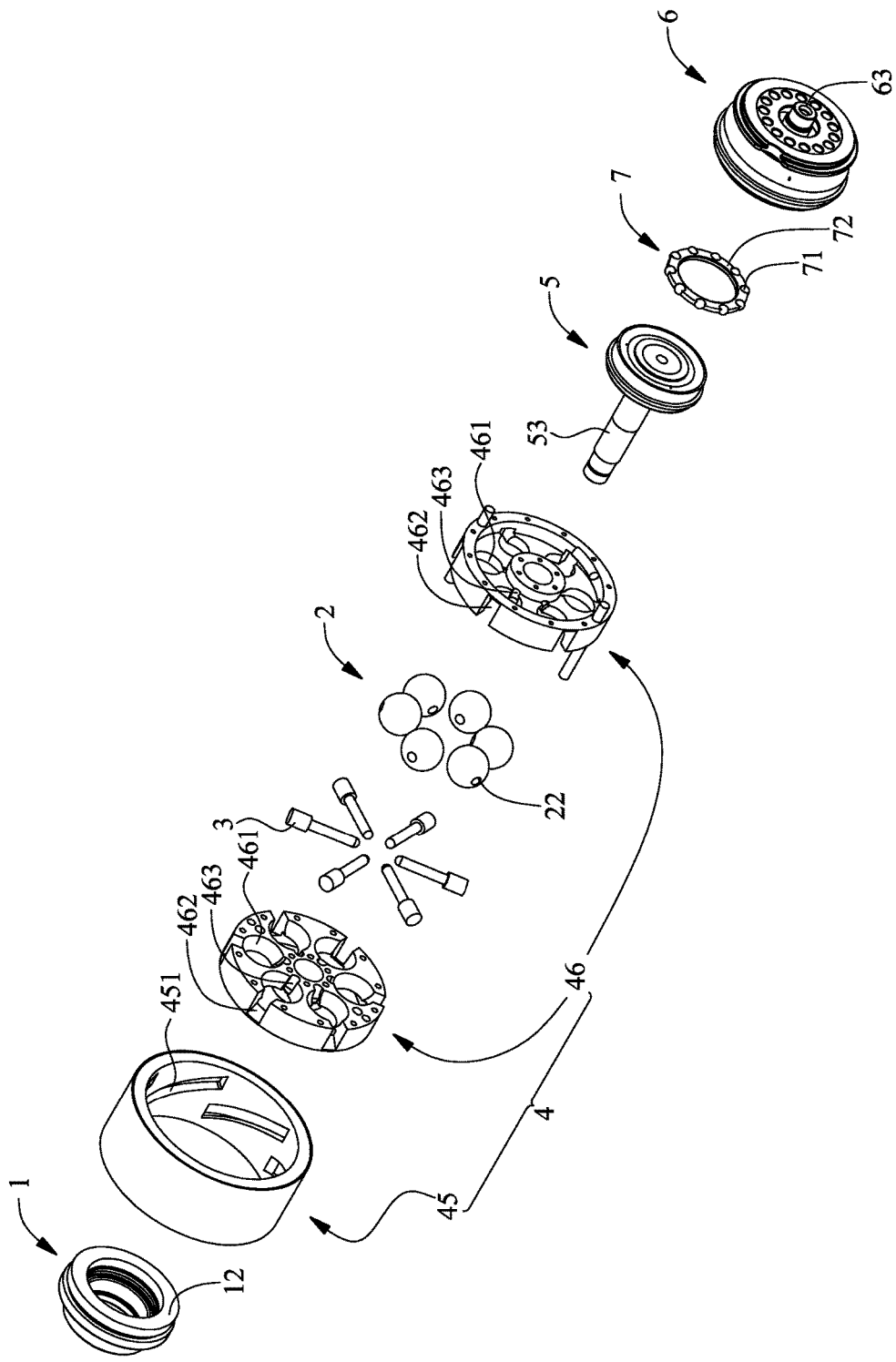
Figure 10:
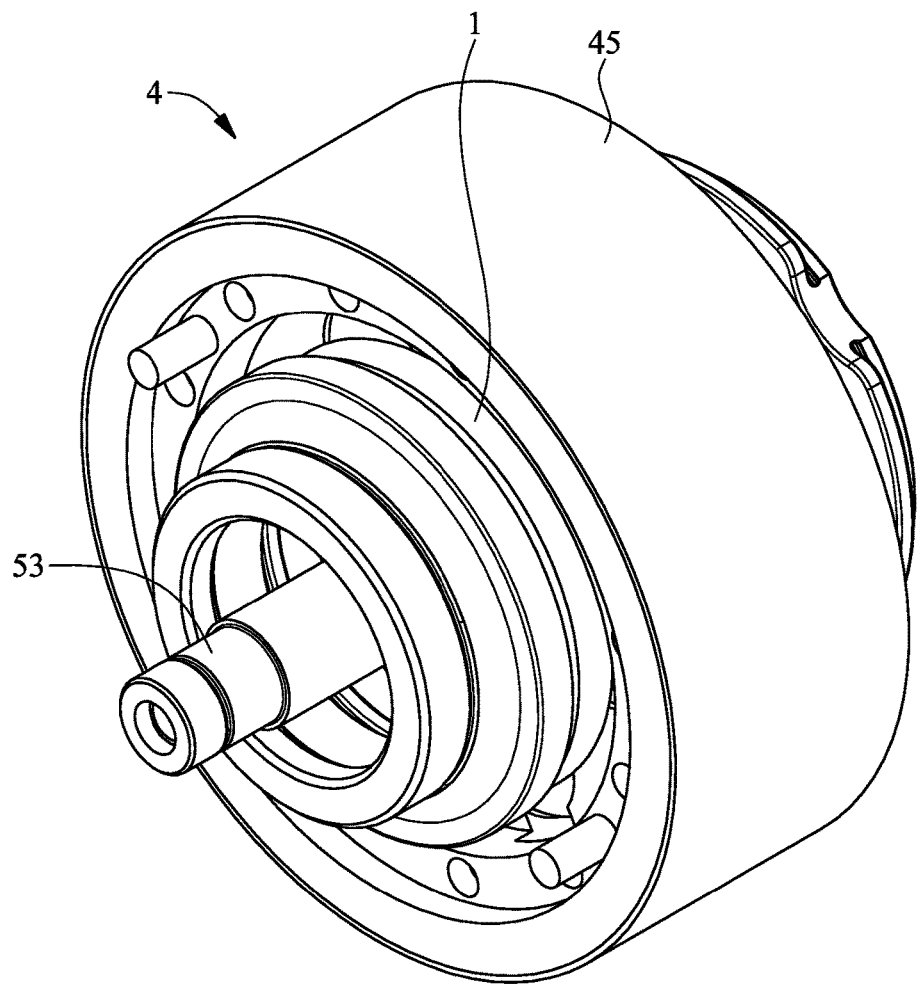
Figure 11:
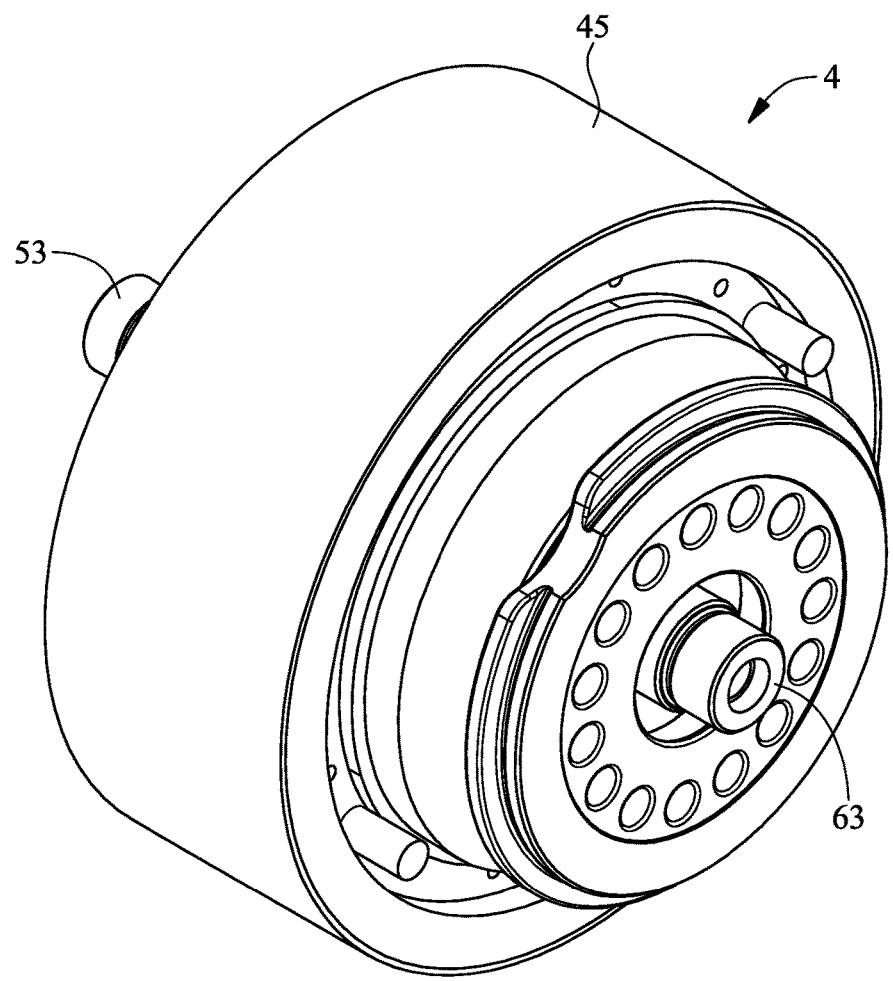
Figure 12:
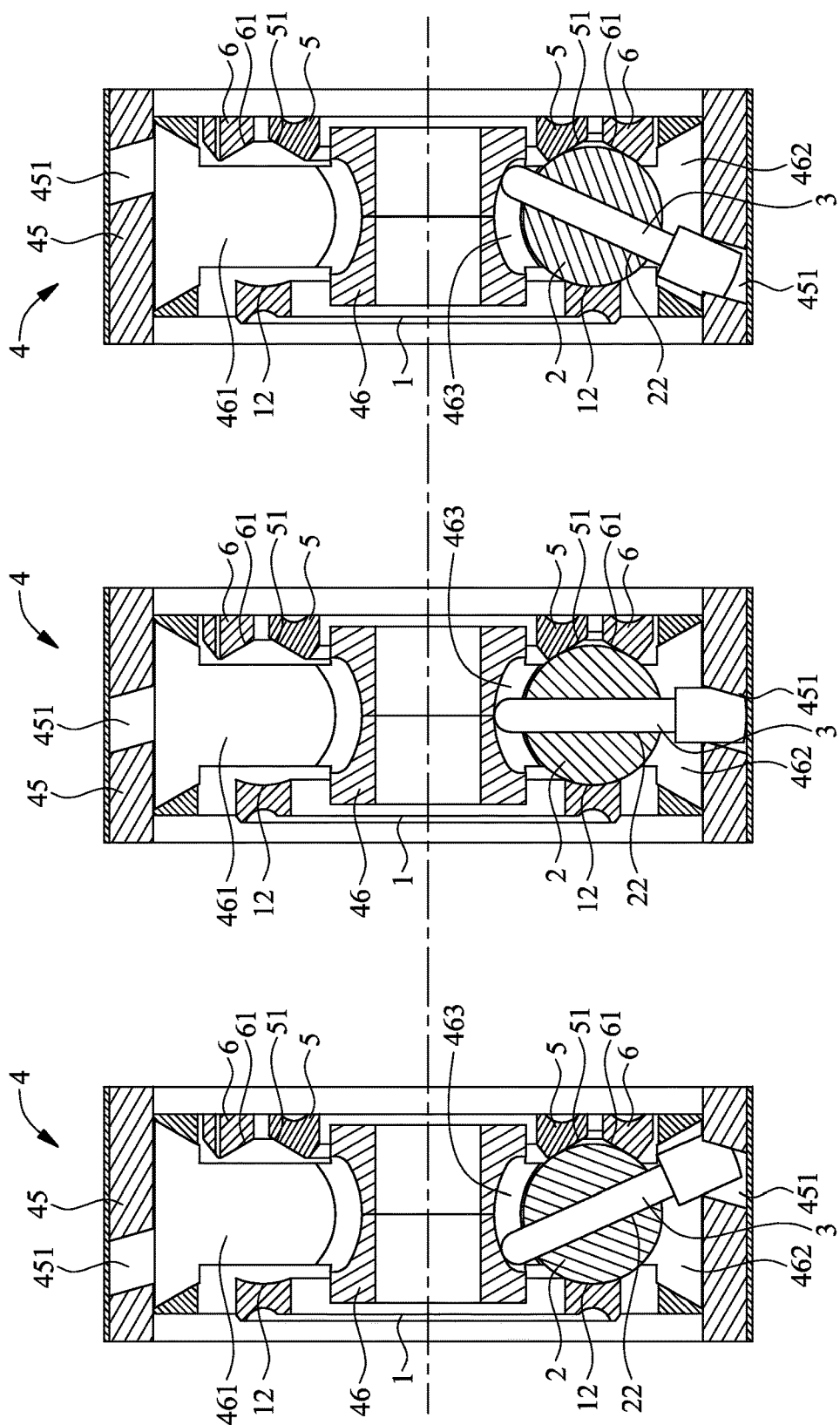

FIG. 5 includes cross-sectional views of a preferred embodiment of the present invention;

FIG. 6 is an exploded view of another driving ring according to a preferred embodiment of the present invention;

FIG. 7 is a perspective view of another driving ring according to a preferred embodiment of the present invention;

FIG. 8 is an exploded view of another preferred embodiment of the present invention;

FIG. 9 is an exploded view of another preferred embodiment of the present invention from another angle of view;

FIG. 10 is a perspective view of another preferred embodiment of the present invention;

FIG. 11 is a perspective view of another preferred embodiment of the present invention from another angle of view; and FIG. 12 includes cross-sectional views of another preferred embodiment of the present invention.

DETAILED DESCRIPTION

Referring to FIG. 1 through FIG. 5, to illustrate how transmission balls 2 and a driving post 3 operate, FIG. 5 shows only how a transmission ball 2 and a driving post 3 operate, because the other transmission balls and the driving post also operate in the way shown in FIG. 5. As shown in the diagrams, the present invention provides a linear gear shift mechanism which comprises a support rotator 1, a plurality of transmission balls 2, a plurality of driving posts 3, a gear shift unit 4, an axial power input rotator 5 and an axial power output rotator 6. The transmission balls 2 are spaced apart from each other and movably disposed on the outer circumferential surface of the support rotator 1. A cylindrical recess 21 is disposed on each transmission ball 2 along the radial direction thereof. The inward ends of the driving posts 3 are movably disposed in the cylindrical recesses 21 along the radial direction of the support rotator 1, respectively. The outward ends of the driving posts 3 are exposed from the cylindrical recesses 21, respectively. The gear shift unit 4 is movably connected to the outward ends of the driving posts 3 and adapted to drive the driving posts 3 to rotate from the radial direction of the support rotator 1 to but not reach the axial direction of the support rotator 1. The axial power input rotator 5 has an inward-tilted power input annular surface 51. The axial power input rotator 5 is pivotally connected to one side of the support rotator 1. The axial power output rotator 6 has an inward-tilted power output annular surface 61. The axial power output rotator 6 is pivotally connected to another side of the support rotator 1. Referring to FIG. 5, the axial power input rotator 5 and the axial power output rotator 6 are disposed on two opposite sides of the transmission balls 2 to thereby movably clamp the transmission balls 2 between the inward-tilted power input annular surface 51, the inward-tilted power output annular surface 61 and the outer circumferential surface of the support rotator 1 and also clamp the other transmission balls (not shown) in the aforesaid manner. The axial power input rotator 5 and the axial power output rotator 6 rotate in opposite directions.

Figure 2:
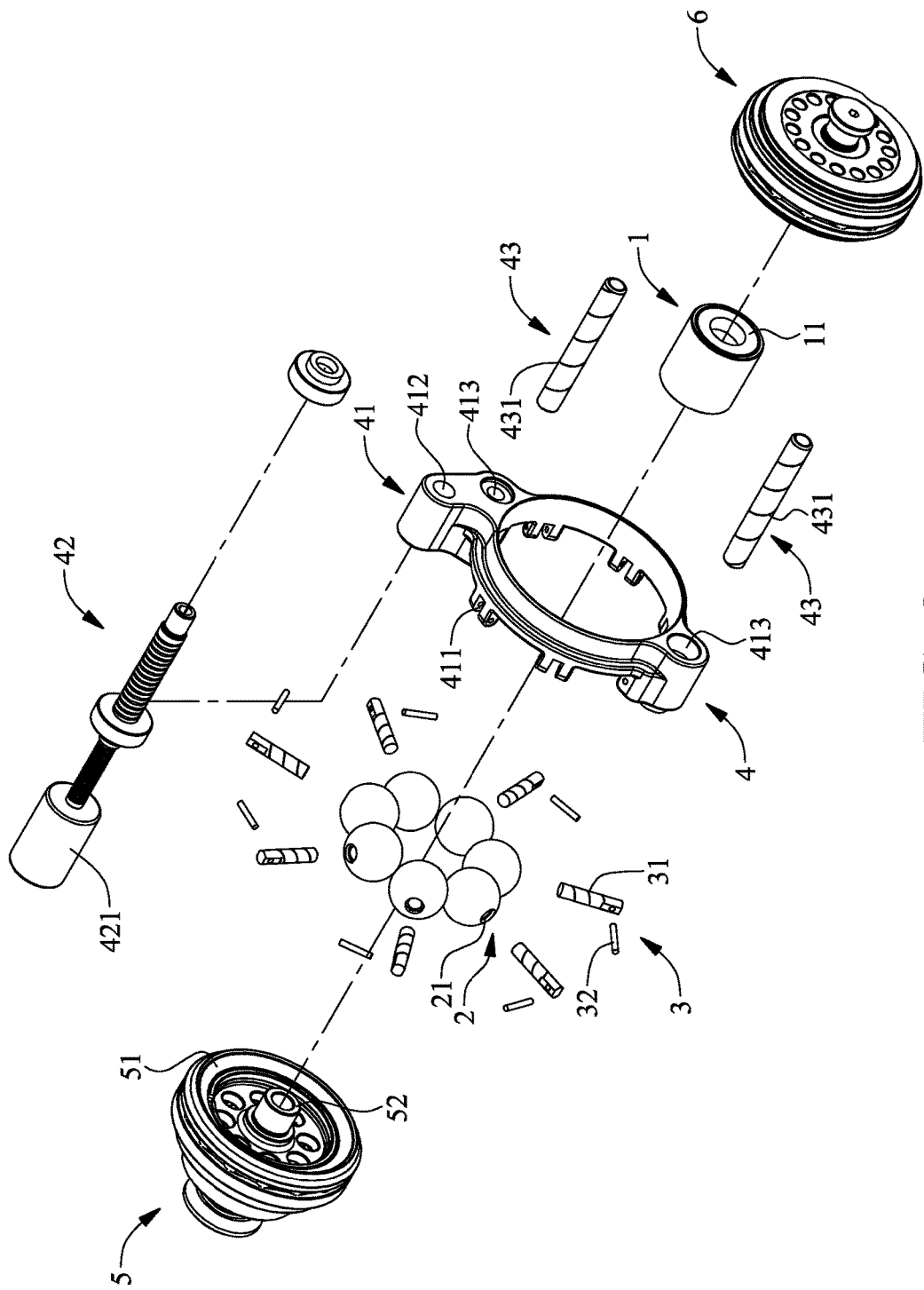
FIG. 2 is an exploded view of a preferred embodiment of the present invention from another angle of view.
Figure 3:
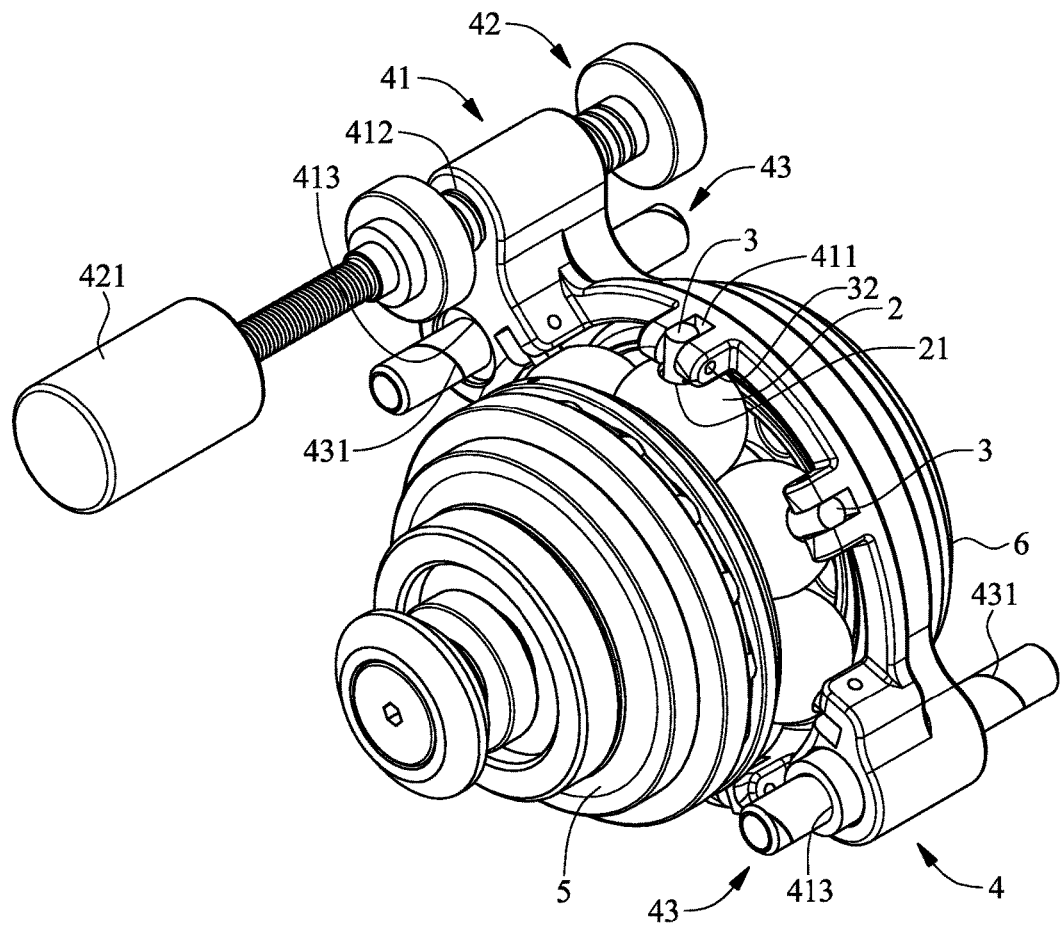
FIG. 3 is a perspective view of a preferred embodiment of the present invention.
Figure 4:
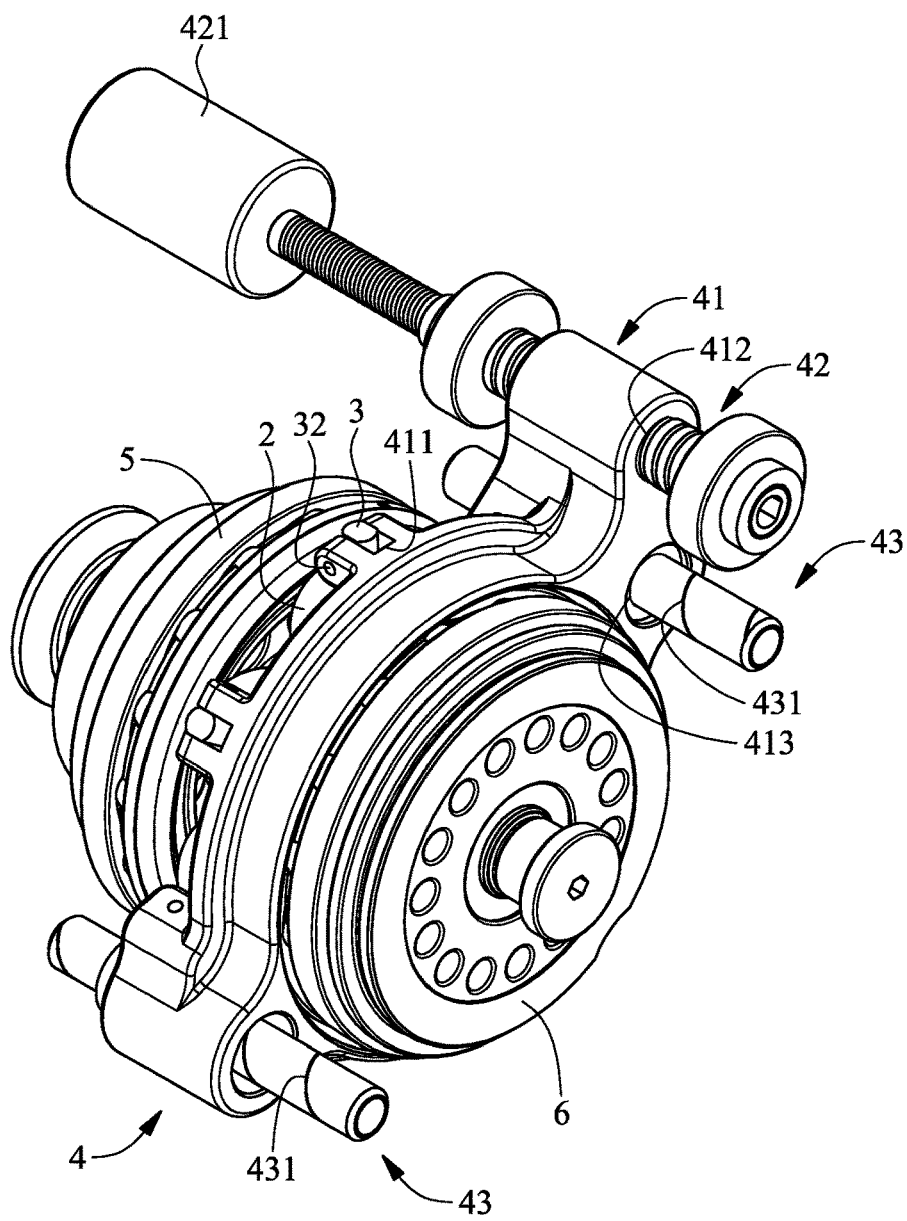
FIG. 4 is a perspective view of a preferred embodiment of the present invention from another angle of view.

Referring to FIG. 3, when the axial power input rotator 5 rotates clockwise, the transmission balls 2 are driven by the inward-tilted power input annular surface 51 (shown in FIG. 2) of the axial power input rotator 5 to rotate counterclockwise, whereas the inward-tilted power output annular surface 61 (shown in FIG. 1) of the axial power output rotator 6 and the axial power output rotator 6 are driven by the transmission balls 2 to rotate counterclockwise; when the axial power input rotator 5 rotates counterclockwise, the transmission balls 2 are driven by the inward-tilted power input annular surface 51 (shown in FIG. 2) of the axial power input rotator 5 to rotate clockwise, whereas the inward-tilted power output annular surface 61 (shown in FIG. 1) of the axial power output rotator 6 and the axial power output rotator 6 are driven by the transmission balls 2 to rotate clockwise.

Referring to the middle diagram through the leftmost diagram of FIG. 5, when the gear shift unit 4 drives the driving posts 3 to rotate counterclockwise, the transmission balls 2 not only turn about the driving posts 3 but also rotate counterclockwise on the outer circumferential surface of the support rotator 1; meanwhile, the inward-tilted power input annular surface 51 of the axial power input rotator 5 comes into contact with the large circumference of the transmission balls 2, whereas the inward-tilted power output annular surface 61 of the axial power output rotator 6 comes into contact with the small circumference of the transmission balls 2, thereby allowing the axial power input rotator 5 to be of a higher speed than the axial power output rotator 6; hence, the linear gear shift mechanism of the present invention effectuates deceleration whenever the driving posts 3 rotate counterclockwise. Referring to the middle diagram through the rightmost diagram of FIG. 5, when the gear shift unit 4 drives the driving posts 3 to rotate clockwise, the transmission balls 2 not only turn about the driving posts 3 but also rotate clockwise on the outer circumferential surface of the support rotator 1; meanwhile, the inward-tilted power input annular surface 51 of the axial power input rotator 5 comes into contact with the small circumference of the transmission balls 2, whereas the inward-tilted power output annular surface 61 of the axial power output rotator 6 comes into contact with the large circumference of the transmission balls 2, thereby allowing the axial power input rotator 5 to be of a lower speed than the axial power output rotator 6; hence, the linear gear shift mechanism of the present invention effectuates acceleration whenever the driving posts 3 rotate clockwise. The operation of a driving post 3 and a transmission ball 2 is described above. The other driving posts and transmission balls also operate in the aforesaid manner.

Referring to FIG. 5, the larger the distance between the axial power input rotator 5 and the axial power output rotator 6, the larger the angle by which the driving posts 3 can rotate. Hence, the linear gear shift mechanism of the present invention is not only structurally simple and compact but also has a wide linear gear-changing range. Furthermore, to enable the linear gear shift mechanism of the present invention to change gear efficiently, the transmission balls 2 come into contact with the inward-tilted power input annular surface 51 smoothly, whereas the inward-tilted power output annular surface 61 comes into contact with the outer circumferential surface of the support rotator 1 smoothly. Therefore, the linear gear shift mechanism of the present invention incurs little transmission loss and never jerks while shifting gear.

Figure 1:
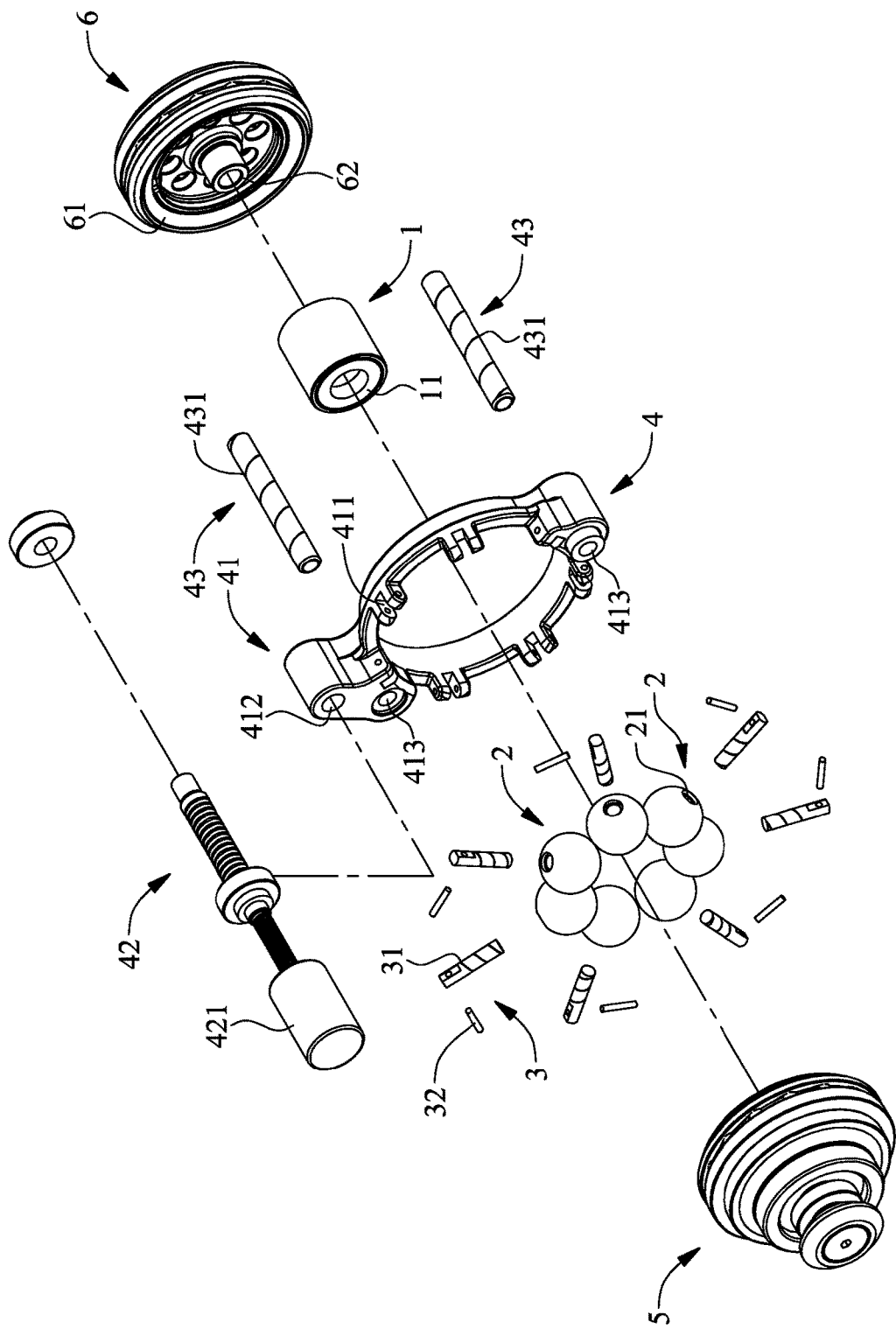
FIG. 1 is an exploded view of a preferred embodiment of the present invention.

Referring to FIG. 1 and FIG. 2, regarding the linear gear shift mechanism, a first oil-guiding groove 31 is disposed on the outer circumferential surface of each driving post 3. Therefore, a lubricant can be disposed between the driving posts 3 and the transmission balls 2 to reduce transmission loss.

Referring to FIG. 1 through FIG. 5, regarding the linear gear shift mechanism, the gear shift unit 4 has a driving screw 42, a driving ring 41 and at least one guiding rod 43. The driving ring 41 is annular. After the driving screw 42 has been driven by a driving motor 421 to rotate, the outward ends of the driving posts 3 get pivotally connected to the driving ring 41 as soon as a pin 32 passes through the two sides of a plurality of pivotal slots 411 on the lateral side of the driving ring 41. The guiding rod 43 is a post. The driving screw 42 penetrates and meshes with a threaded hole 412 of the driving ring 41. The guiding rod 43 movably penetrates a guide hole 413 of the driving ring 41. Referring to FIG. 1, FIG. 3 and FIG. 5, the driving screw 42 drives the driving ring 41 to undergo translation in the axial direction of the guiding rod 43 and the support rotator 1, such that the driving ring 41 drives the driving posts 3 and the transmission balls 2 to rotate, thereby allowing the linear gear shift mechanism of the present invention to change gear. Furthermore, the guiding rod 43 is provided in the plural and arranged symmetrically, such that the driving ring 41 moves in a balanced manner while being driven by the driving screw 42 to undergo translation.

Referring to FIG. 6 and FIG. 7, regarding the linear gear shift mechanism, the gear shift unit 4 has two halved driving rings 414 which mesh with each other. The halved driving rings 414 are annular. A plurality of cavities 4141 and a plurality of semi-cylindrical notches 4142 are disposed on the lateral side of each halved driving ring 414. Each cavity 4141 is bilaterally in communication with a semi-cylindrical notch 4142. The cavities 4141 pair up to form a plurality of pivotal through holes 4143. The semi-cylindrical notches 4142 pair up to form a plurality of pivotal cylindrical passages (not shown). A pin 32 passes through the outward ends of the driving posts 3. The outward ends of the driving posts 3 are movably received in the pivotal through holes 4143, respectively. The two ends of each pin 32 are movably received in the pivotal cylindrical passages, respectively, such that the outward ends of the driving posts 3 are pivotally connected to the halved driving rings 414. Similarly, the halved driving rings 414 operate in conjunction with the driving screw 42, the driving motor 421 and the guiding rod 43, such that the driving screw 42 drives the halved driving rings 414 to undergo translation in the axial direction of the guiding rod 43 and the support rotator 1.

Referring to FIG. 1 and FIG. 2, regarding the linear gear shift mechanism, a second oil-guiding groove 431 is disposed on the circumferential surface of each guiding rod 43. Therefore, a lubricant can be disposed between the guiding rod 43 and the driving ring 41 to reduce transmission loss.

Referring to FIG. 1 and FIG. 2, regarding the linear gear shift mechanism, the axial power input rotator 5 has a first connection shaft 52 pivotally connected to one side of the support rotator 1, whereas the axial power output rotator 6 has a second connection shaft 62 pivotally connected to the other side of the support rotator 1. Therefore, the support rotator 1 is supported by the axial power input rotator 5 and the axial power output rotator 6, such that the axial power input rotator 5 and the axial power output rotator 6 connect with each other and rotate backward.

Referring to FIG. 1 and FIG. 2, regarding the linear gear shift mechanism, two bearings 11 are disposed on two sides of the support rotator 1, respectively, and connected to the first connection shaft 52 and the second connection shaft 62, respectively. Therefore, the support rotator 1 is supported by the axial power input rotator 5 and the axial power output rotator 6, such that the axial power input rotator 5 and the axial power output rotator 6 connect with each other and rotate backward.

Referring to FIG. 8 through FIG. 12, to illustrate how transmission balls 2 and driving posts 3 operate, FIG. 12 shows only how a transmission ball 2 and a driving posts 3 operate, because the other transmission balls and driving posts also operate in the way shown in FIG. 12. As shown in the diagrams, the present invention provides another linear gear shift mechanism which comprises a support rotator 1, a plurality of transmission balls 2, a plurality of driving posts 3, a gear shift unit 4, an axial power input rotator 5 and an axial power output rotator 6. The transmission balls 2 are spaced apart from each other and movably disposed on a lateral annular surface 12 of the support rotator 1. The lateral annular surface 12 is concaved and curved to thereby operate in conjunction with the transmission balls 2. A cylindrical channel 22 or a cylindrical recess 21 (shown in FIG. 5 and FIG. 6) is disposed on each transmission ball 2 along the radial direction thereof. The inward ends of the driving posts 3 movably penetrate the cylindrical channels 22, respectively, along the radial direction of the support rotator 1, and, alternatively, the inward ends of the driving posts 3 are movably disposed in the cylindrical recesses 21, respectively, along the radial direction of the support rotator 1, as shown in FIG. 5 and FIG. 6. The outward ends of the driving posts 3 are exposed from the cylindrical channels 22 or the cylindrical recesses 21, respectively, as shown in FIG. 5 and FIG. 6. When the inward ends of the driving posts 3 movably penetrate the cylindrical channels 22, respectively, the gear shift unit 4 is movably connected to the inward ends and outward ends of the driving posts 3. When the inward ends of the driving posts 3 are movably disposed in the cylindrical recesses 21, respectively, as shown in FIG. 5 and FIG. 6, the gear shift unit 4 is movably connected to the outward ends of the driving posts 3, thereby allowing the gear shift unit 4 to drive the driving posts 3 to rotate from the axial direction of the support rotator 1 to but not reach the axial direction of the support rotator 1. The axial power input rotator 5 has an inward-tilted power input annular surface 51. The axial power output rotator 6 has an inward-tilted power output annular surface 61. Referring to FIG. 12, the inward-tilted power input annular surface 51 of the axial power input rotator 5 is positioned inward to the inward-tilted power output annular surface 61 of the axial power output rotator 6, and both the axial power input rotator 5 and the axial power output rotator 6 are positioned on the same side of the transmission balls 2. The support rotator 1 is positioned beside the transmission balls 2 in a manner to be opposite to the axial power input rotator 5 and the axial power output rotator 6. Hence, the transmission balls 2 are movably clamped between the inward-tilted power input annular surface 51, the inward-tilted power output annular surface 61 and the lateral annular surface 12 of the support rotator 1, so are the other transmission balls not shown. The axial power input rotator 5 and the axial power output rotator 6 rotate in the same directions.

Referring to FIG. 8, when the axial power input rotator 5 rotates clockwise, the transmission balls 2 are driven by the inward-tilted power input annular surface 51 of the axial power input rotator 5 to rotate clockwise, whereas the inward-tilted power output annular surface 61 of the axial power output rotator 6 and the axial power output rotator 6 are driven by the transmission balls 2 to rotate clockwise; when the axial power input rotator 5 rotates counterclockwise, the transmission balls 2 are driven by the inward-tilted power input annular surface 51 of the axial power input rotator 5 to rotate counterclockwise, whereas the inward-tilted power output annular surface 61 of the axial power output rotator 6 and the axial power output rotator 6 are driven by the transmission balls 2 to rotate counterclockwise.

Referring to the middle diagram through the leftmost diagram of FIG. 12, when the gear shift unit 4 drives the driving posts 3 to rotate counterclockwise, the transmission balls 2 not only turn about the driving posts 3 but also rotate counterclockwise on the lateral annular surface 12 of the support rotator 1; meanwhile, the inward-tilted power input annular surface 51 of the axial power input rotator 5 comes into contact with the large circumference of the transmission balls 2, whereas the inward-tilted power output annular surface 61 of the axial power output rotator 6 comes into contact with the small circumference of the transmission balls 2, thereby allowing the axial power input rotator 5 to be of a higher speed than the axial power output rotator 6; hence, another linear gear shift mechanism of the present invention effectuates deceleration whenever the driving posts 3 rotates counterclockwise. Referring to the middle diagram through the rightmost diagram of FIG. 12, when the gear shift unit 4 drives the driving posts 3 to rotate clockwise, the transmission balls 2 not only turn about the driving posts 3 but also rotate clockwise on the lateral annular surface 12 of the support rotator 1; meanwhile, the inward-tilted power input annular surface 51 of the axial power input rotator 5 comes into contact with the small circumference of the transmission balls 2, whereas the inward-tilted power output annular surface 61 of the axial power output rotator 6 comes into contact with the large circumference of the transmission balls 2, thereby allowing the axial power input rotator 5 to be of a lower speed than the axial power output rotator 6; hence, another linear gear shift mechanism of the present invention effectuates acceleration whenever the driving posts 3 rotates clockwise. The operation of a driving post 3 and a transmission ball 2 is described above. The other driving posts and transmission balls also operate in the aforesaid manner.

Referring to FIG. 12, the larger the distance between the support rotator 1, the axial power input rotator 5, and the axial power output rotator 6, the larger the angle by which the driving posts 3 can rotate. Hence, another linear gear shift mechanism of the present invention is not only structurally simple and compact but also has a wide linear gear-changing range. Furthermore, to enable another linear gear shift mechanism of the present invention to change gear efficiently, the transmission balls 2 come into contact with the inward-tilted power input annular surface 51 smoothly, whereas the inward-tilted power output annular surface 61 comes into contact with the lateral annular surface 12 of the support rotator 1 smoothly. Therefore, another linear gear shift mechanism of the present invention incurs little transmission loss and never jerks while shifting gear.

Referring to FIG. 8, FIG. 9 and FIG. 12, regarding the aforesaid linear gear shift mechanism, in the situation where the inward ends of the driving posts 3 movably penetrate the cylindrical channels 22, respectively, the gear shift unit 4 has a driving ring 45 and a limitator 46. As shown in FIG. 8 and FIG. 9, the limitator 46 is divided into halves, whereas the axial limiting through holes 461, the axial guide opening 462 and the axial curved guide slot 463 of the limitator 46 are each divided into halves. The inward annular surface of the driving ring 45 is arranged in a manner to curve to be become circular and has oblique guide slots 451 which are spaced apart from each other. The limitator 46 is cylindrical and has a plurality of axial limiting through holes 461 arranged in a manner to surround the axis of the support rotator 1. The axial limiting through holes 461 are each internally curved. An axial guide opening 462 is disposed on the radial outward side of each axial limiting through hole 461. An axial curved guide slot 463 is disposed on the radial inward side of each axial limiting through hole 461. Referring to FIG. 12, the axial curved guide slot 463 sinks toward the axis thereof so as to become curved. The driving ring 45 is movably disposed outside the limitator 46. The transmission balls 2 are movably confined to the axial limiting through holes 461, respectively. The two opposite sides of the transmission balls 2 are exposed from the two opposite sides of the axial limiting through holes 461 so as to roll and come into contact with the inward-tilted power input annular surface 51, the inward-tilted power output annular surface 61 and the lateral annular surface 12 of the support rotator 1. The inward ends of the driving posts 3 are movably disposed in the axial curved guide slots 463, respectively.

The outward ends of the driving posts 3 are movably disposed in the oblique guide slots 451 through the axial guide openings 462, respectively. The driving ring 45 rotates about the limitator 46 by the axis of the support rotator 1. Referring to FIG. 8 and FIG. 12, since the two ends of each driving post 3 are guided by the axial guide opening 462 and the axial curved guide slot 463, respectively, the two ends of the driving post 3 can only move in the axial direction of the support rotator 1; afterward, when the driving ring 45 starts to rotate about the limitator 46, the outward ends of the driving posts 3 are guided to move rightward (as shown in the middle diagram through the leftmost diagram of FIG. 12) or leftward (as shown in the middle diagram through the rightmost diagram of FIG. 12) by the oblique guide slots 451 of the driving ring 45, so as to cause the driving posts 3 and the transmission balls 2 to simultaneously rotate counter-clockwise (as shown in the middle diagram through the leftmost diagram of FIG. 12) or simultaneously rotate clockwise (as shown in the middle diagram through the rightmost diagram of FIG. 12.)

Referring to FIG. 8, FIG. 10 and FIG. 12 as well as FIG. 1, FIG. 3 and FIG. 5, regarding the aforesaid linear gear shift mechanism, in the situation where the inward ends of the driving posts 3 are movably disposed in the cylindrical recesses 21, respectively, the gear shift unit 4 has a driving screw 42, a driving ring 41 and at least one guiding rod 43, just like the previous linear gear shift mechanism. The driving ring 41 is annular. After the driving screw 42 has been driven by a driving motor 421 to rotate, the outward ends of the driving posts 3 get pivotally connected to the driving ring 41 as soon as a pin 32 passes through the two sides of a plurality of pivotal slots 411 on the lateral side of the driving ring 41. The guiding rod 43 is a post. The driving screw 42 penetrates and meshes with a threaded hole 412 of the driving ring 41. The guiding rod 43 movably penetrates a guide hole 413 of the driving ring 41. The driving screw 42 drives the driving ring 41 to undergo translation along the guiding rod 43 as shown in FIG. 1, FIG. 3 and FIG. 5 and in the axial direction of the support rotator 1, such that the driving ring 41 drives the driving posts 3 and the transmission balls 2 to rotates as shown in FIG. 8, FIG. 10 and FIG. 12, thereby allowing another linear gear shift mechanism of the present invention to change gear. Furthermore, the guiding rod 43 is provided in the plural and arranged symmetrically, such that the driving ring 41 moves in a balanced manner while being driven by the driving screw 42 to undergo translation.

Referring to FIG. 8, FIG. 10 and FIG. 12 as well as FIG. 6 and FIG. 7, regarding the aforesaid linear gear shift mechanism, in the situation where the inward ends of the driving posts 3 are movably disposed in the cylindrical recesses 21, respectively, the gear shift unit 4 has two halved driving rings 414 which mesh with each other, just like the previous linear gear shift mechanism. The halved driving rings 414 are annular. A plurality of cavities 4141 and a plurality of semi-cylindrical notches 4142 are disposed on the lateral side of each halved driving ring 414. Each cavity 4141 is bilaterally in communication with a semi-cylindrical notch 4142. The cavities 4141 pair up to form a plurality of pivotal through holes 4143. The semi-cylindrical notches 4142 pair up to form a plurality of pivotal cylindrical passages (not shown). A pin 32 passes through the outward ends of the driving posts 3. The outward ends of the driving posts 3 are movably received in the pivotal through holes 4143, respectively. The two ends of each pin 32 are movably received in the pivotal cylindrical passages, respectively, such that the outward ends of the driving posts 3 are pivotally connected to the halved driving rings 414. Similarly, the halved driving rings 414 operate in conjunction with the driving screw 42, the driving motor 421 and the guiding rod 43, such that the driving screw 42 drives the halved driving rings 414 to undergo translation in the axial direction of the guiding rod 43 and the support rotator 1 as shown in FIG. 8, FIG. 10 and FIG. 12.

Referring to FIG. 8 through FIG. 10, regarding the aforesaid linear gear shift mechanism, the axial power input rotator 5 has an axial power input shaft 53. The axial power input shaft 53 passes through the center of the limitator 46 of the gear shift unit 4, the center between the transmission balls 2, and the center of the support rotator 1, such that the axial power input shaft 53 can be exposed from the support rotator 1. The axial power output rotator 6 has an axial power output shaft 63. Therefore, another linear gear shift mechanism of the present invention is characterized in that power is input through the axial power input shaft 53 and then output from the axial power output shaft 63.

Referring to FIG. 8 and FIG. 9, the aforesaid linear gear shift mechanism further comprises a ball ring 7. The ball ring 7 has a plurality of balls 71 and a positioning ring 72. The balls 71 are spaced apart from each other and movably positioned in a plurality of positioning recesses of the positioning ring 72. The balls 71 are movably clamped between the axial power input rotator 5 and the axial power output rotator 6 to reduce the friction-induced loss incurred between the axial power input rotator 5 and the axial power output rotator 6.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A linear gear shift mechanism, comprising:
   a support rotator;
   a plurality of transmission balls spaced apart from each other and movably disposed on an outer circumferential surface of the support rotator, with a cylindrical recess disposed on each said transmission ball along a radial direction thereof;
   a plurality of driving posts with inward ends movably disposed in the cylindrical recesses along a radial direction of the support rotator;
   a gear shift unit movably connected to outward ends of the driving posts and adapted to drive the driving posts to rotate from the radial direction of the support rotator to but not reach an axial direction of the support rotator;
   an axial power input rotator having an inward-tilted power input annular surface; and
   an axial power output rotator having an inward-tilted power output annular surface, wherein the axial power input rotator and the axial power output rotator are disposed on two opposite sides of the transmission balls to movably clamp the transmission balls between the inward-tilted power input annular surface, the inward-tilted power output annular surface and the outer circumferential surface of the support rotator;
   wherein the gear shift unit has a driving ring pivotally connected to the outward ends of the driving posts and capable of undergoing translation in the axial direction of the support rotator.

2. The linear gear shift mechanism of claim 1, wherein a first oil-guiding groove is disposed on a circumferential surface of each said driving post.

3. The linear gear shift mechanism of claim 1, wherein the axial power input rotator has a first connection shaft pivotally connected to a side of the support rotator, and the axial power output rotator has a second connection shaft pivotally connected to another side of the support rotator.

4. The linear gear shift mechanism of claim 3, wherein two bearings are disposed on two sides of the support rotator, respectively, and connected to the first connection shaft and the second connection shaft, respectively.

5. A linear gear shift mechanism, comprising:
  a support rotator;
  a plurality of transmission balls spaced apart from each other and movably disposed on a lateral annular surface of the support rotator, wherein one of a cylindrical channel and a cylindrical recess is disposed on each said transmission ball along a radial direction thereof;
  a plurality of driving posts with inward ends movably penetrating the cylindrical channels along a radial direction of the support rotator, respectively, or movably disposed in the cylindrical recesses along the radial direction of the support rotator, respectively;
  a gear shift unit movably connected to inward ends and outward ends of the driving posts when the inward ends of the driving posts movably penetrate the cylindrical channels, respectively, and movably connected to the outward ends of the driving posts when the inward ends of the driving posts are movably disposed in the cylindrical recesses, respectively, wherein the gear shift unit drives the driving posts to rotate from the radial direction of the support rotator to but not reach an axial direction of the support rotator;
  an axial power input rotator having an inward-tilted power input annular surface; and
  an axial power output rotator having an inward-tilted power output annular surface, wherein the axial power input rotator and the axial power output rotator are disposed on a same side of the transmission balls, whereas the support rotator is positioned beside the transmission balls in a manner to be opposite to the axial power input rotator and the axial power output rotator, so as to movably clamp the transmission balls between the inward-tilted power input annular surface, the inward-tilted power output annular surface and the lateral annular surface of the support rotator;
  wherein, when the inward ends of the driving posts movably penetrate the cylindrical channels, respectively, the gear shift unit has a driving ring and a limitator, wherein a plurality of oblique guide slots is disposed on an inward annular surface of the driving ring, wherein the limitator has a plurality of axial limiting through holes arranged in a manner to surround an axis of the support rotator, wherein an axial guide opening is disposed on a radial outward side of each axial limiting through hole, wherein an axial curved guide slot is disposed on a radial inward side of each axial limiting through hole, wherein the driving ring is movably disposed outside the limitator, wherein the transmission balls are movably confined to the axial limiting through holes, respectively, wherein two opposite sides of the transmission balls are exposed from two opposite sides of the axial limiting through holes so as to movably come into contact with the inward-tilted power input annular surface, the inward-tilted power output annular surface and the lateral annular surface of the support rotator, wherein the inward ends of the driving posts are movably disposed in the axial curved guide slots, respectively, wherein the outward ends of the driving posts are movably disposed in the oblique guide slots through the axial guide openings, respectively, with the driving ring rotating about the limitator by an axis of the support rotator.

6. The linear gear shift mechanism of claim 5, wherein the axial power input rotator has an axial power input shaft which passes the transmission balls and penetrates the support rotator to get exposed from the support rotator.

7. The linear gear shift mechanism of claim 5, further comprising a ball ring having a plurality of balls and a positioning ring, with the balls spaced apart from each other, movably positioned at the positioning ring, and movably clamped between the axial power input rotator and the axial power output rotator.

8. A linear gear shift mechanism, comprising:
  a support rotator;
  a plurality of transmission balls spaced apart from each other and movably disposed on an outer circumferential surface of the support rotator, with a cylindrical recess disposed on each said transmission ball along a radial direction thereof;
  a plurality of driving posts with inward ends movably disposed in the cylindrical recesses along a radial direction of the support rotator;
  a gear shift unit movably connected to outward ends of the driving posts and adapted to drive the driving posts to rotate from the radial direction of the support rotator to but not reach an axial direction of the support rotator;
  an axial power input rotator having an inward-tilted power input annular surface; and
  an axial power input rotator having an inward-tilted power input annular surface; and an axial power output rotator having an inward-tilted power output annular surface, wherein the axial power input rotator and the axial power output rotator are disposed on two opposite sides of the transmission balls to movably clamp the transmission balls between the inward-tilted power input annular surface, the inward-tilted power output annular surface and the outer circumferential surface of the support rotator;
  wherein the gear shift unit has two halved driving rings which mesh with each other, with a plurality of cavities disposed on each said halved driving ring to join and thereby form a plurality of pivotal through holes for pivotally connecting with the outward ends of the driving posts, wherein the halved driving rings undergo translation in the axial direction of the support rotator.

9. A linear gear shift mechanism, comprising:
  a support rotator;
  a plurality of transmission balls spaced apart from each other and movably disposed on an outer circumferential surface of the support rotator, with a cylindrical recess disposed on each said transmission ball along a radial direction thereof;
  a plurality of driving posts with inward ends movably disposed in the cylindrical recesses along a radial direction of the support rotator;
  a gear shift unit movably connected to outward ends of the driving posts and adapted to drive the driving posts to rotate from the radial direction of the support rotator to but not reach an axial direction of the support rotator;
  an axial power input rotator having an inward-tilted power input annular surface; and an axial power output rotator having an inward-tilted power output annular surface, wherein the axial power input rotator and the axial power output rotator are disposed on two opposite sides of the transmission balls to movably clamp the transmission balls between the inward-tilted power input annular surface, the inward-tilted power output annular surface and the outer circumferential surface of the support rotator;

wherein the axial power input rotator has a first connection shaft pivotally connected to a side of the support rotator, and the axial power output rotator has a second connection shaft pivotally connected to another side of the support rotator.

10. A linear gear shift mechanism, comprising:

a support rotator;

a plurality of transmission balls spaced apart from each other and movably disposed on a lateral annular surface of the support rotator, wherein one of a cylindrical channel and a cylindrical recess is disposed on each said transmission ball along a radial direction thereof;

a plurality of driving posts with inward ends movably penetrating the cylindrical channels along a radial direction of the support rotator, respectively, or movably disposed in the cylindrical recesses along the radial direction of the support rotator, respectively;

a gear shift unit movably connected to inward ends and outward ends of the driving posts when the inward ends of the driving posts movably penetrate the cylindrical channels, respectively, and movably connected to the outward ends of the driving posts when the inward ends of the driving posts are movably disposed in the cylindrical recesses, respectively, wherein the gear shift unit drives the driving posts to rotate from the radial direction of the support rotator to but not reach an axial direction of the support rotator;

an axial power input rotator having an inward-tilted power input annular surface; and an axial power output rotator having an inward-tilted power output annular surface, wherein the axial power input rotator and the axial power output rotator are disposed on a same side of the transmission balls, whereas the support rotator is positioned beside the transmission balls in a manner to be opposite to the axial power input rotator and the axial power output rotator, so as to movably clamp the transmission balls between the inward-tilted power input annular surface, the inward-tilted power output annular surface and the lateral annular surface of the support rotator;

wherein, when the inward ends of the driving posts are movably disposed in the cylindrical recesses, respectively, the gear shift unit has a driving ring pivotally connected to the outward ends of the driving posts, thereby allowing the driving ring to undergo translation in the axial direction of the support rotator.

11. A linear gear shift mechanism, comprising:

a support rotator;

a plurality of transmission balls spaced apart from each other and movably disposed on a lateral annular surface of the support rotator, wherein one of a cylindrical channel and a cylindrical recess is disposed on each said transmission ball along a radial direction thereof;

a plurality of driving posts with inward ends movably penetrating the cylindrical channels along a radial direction of the support rotator, respectively, or movably disposed in the cylindrical recesses along the radial direction of the support rotator, respectively;

a gear shift unit movably connected to inward ends and outward ends of the driving posts when the inward ends of the driving posts movably penetrate the cylindrical channels, respectively, and movably connected to the outward ends of the driving posts when the inward ends of the driving posts are movably disposed in the cylindrical recesses, respectively, wherein the gear shift unit drives the driving posts to rotate from the radial direction of the support rotator to but not reach an axial direction of the support rotator;

an axial power input rotator having an inward-tilted power input annular surface; and an axial power output rotator having an inward-tilted power output annular surface, wherein the axial power input rotator and the axial power output rotator are disposed on a same side of the transmission balls, whereas the support rotator is positioned beside the transmission balls in a manner to be opposite to the axial power input rotator and the axial power output rotator, so as to movably clamp the transmission balls between the inward-tilted power input annular surface, the inward-tilted power output annular surface and the lateral annular surface of the support rotator;

wherein, when the inward ends of the driving posts are movably disposed in the cylindrical recesses, respectively, the gear shift unit has two halved driving rings which mesh with each other, with a plurality of cavities disposed on each said halved driving ring and adapted to join and thereby form a plurality of pivotal through holes for pivotally connecting with the outward ends of the driving posts, wherein the halved driving rings undergo translation in the axial direction of the support rotator.

12. A linear gear shift mechanism, comprising:

a support rotator;

a plurality of transmission balls spaced apart from each other and movably disposed on a lateral annular surface of the support rotator, wherein one of a cylindrical channel and a cylindrical recess is disposed on each said transmission ball along a radial direction thereof;

a plurality of driving posts with inward ends movably penetrating the cylindrical channels along a radial direction of the support rotator, respectively, or movably disposed in the cylindrical recesses along the radial direction of the support rotator, respectively;

a gear shift unit movably connected to inward ends and outward ends of the driving posts when the inward ends of the driving posts movably penetrate the cylindrical channels, respectively, and movably connected to the outward ends of the driving posts when the inward ends of the driving posts are movably disposed in the cylindrical recesses, respectively, wherein the gear shift unit drives the driving posts to rotate from the radial direction of the support rotator to but not reach an axial direction of the support rotator;

an axial power input rotator having an inward-tilted power input annular surface; and an axial power output rotator having an inward-tilted power output annular surface, wherein the axial power input rotator and the axial power output rotator are disposed on a same side of the transmission balls, whereas the support rotator is positioned beside the transmission balls in a manner to be opposite to the axial power input rotator and the axial power output rotator, so as to movably clamp the transmission balls between the inward-tilted power input annular surface, the inward-tilted power output annular surface and the lateral annular surface of the support rotator;

further comprising a ball ring having a plurality of balls and a positioning ring, with the balls spaced apart from each other, movably positioned at the positioning ring, and movably clamped between the axial power input rotator and the axial power output rotator.

* * * * *